Figure 1:
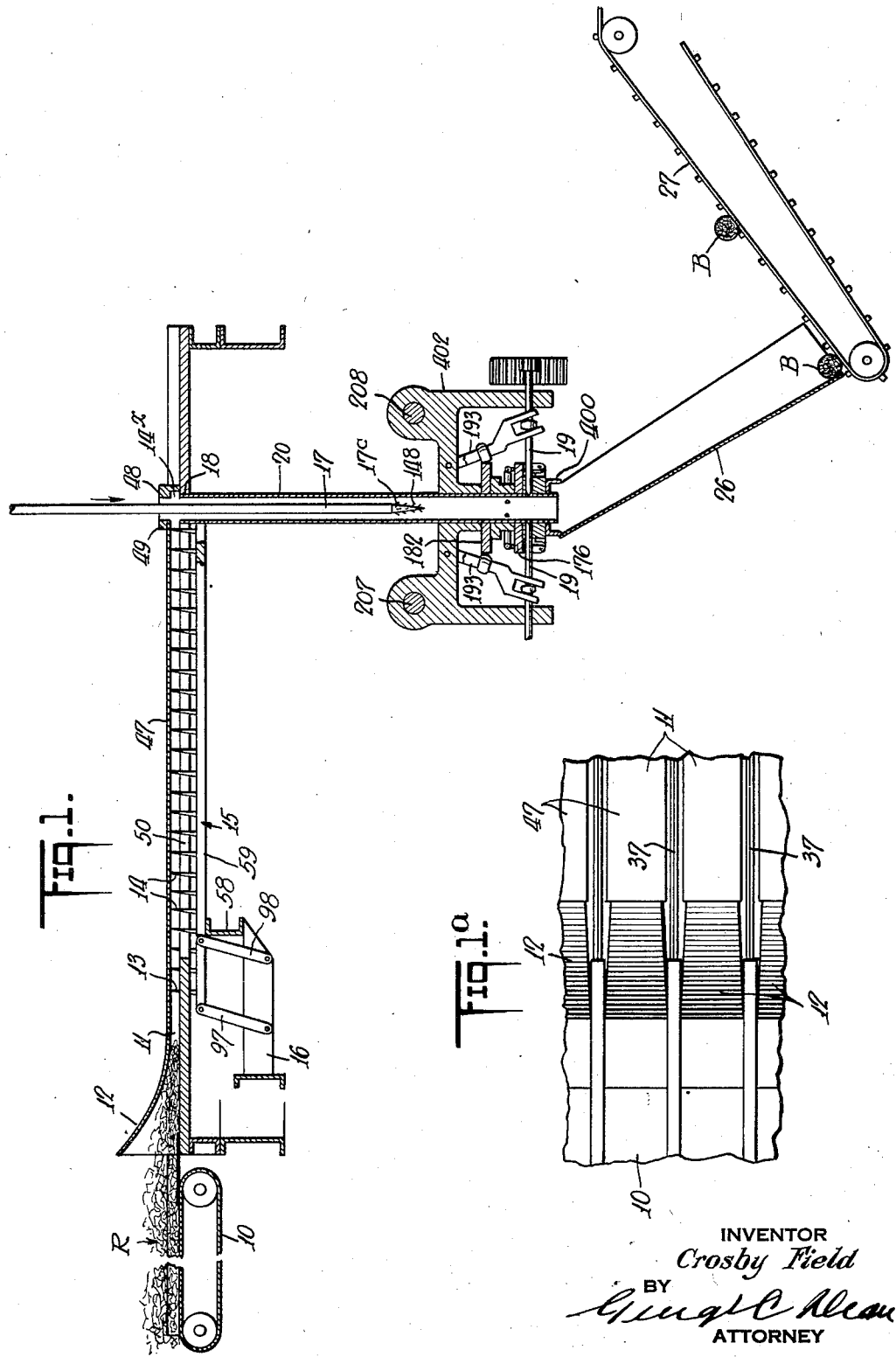

Aug. 27, 1935. C. FIELD 2,012,908
METHOD OF AND APPARATUS FOR HANDLING AND SHAPING METAL WOOL
Filed Nov. 16, 1932 11 Sheets-Sheet 3

INVENTOR
*Crosby Field*
BY
ATTORNEY

Aug. 27, 1935.　　　　　　C. FIELD　　　　　　2,012,908
METHOD OF AND APPARATUS FOR HANDLING AND SHAPING METAL WOOL
Filed Nov. 16, 1932　　　11 Sheets-Sheet 4
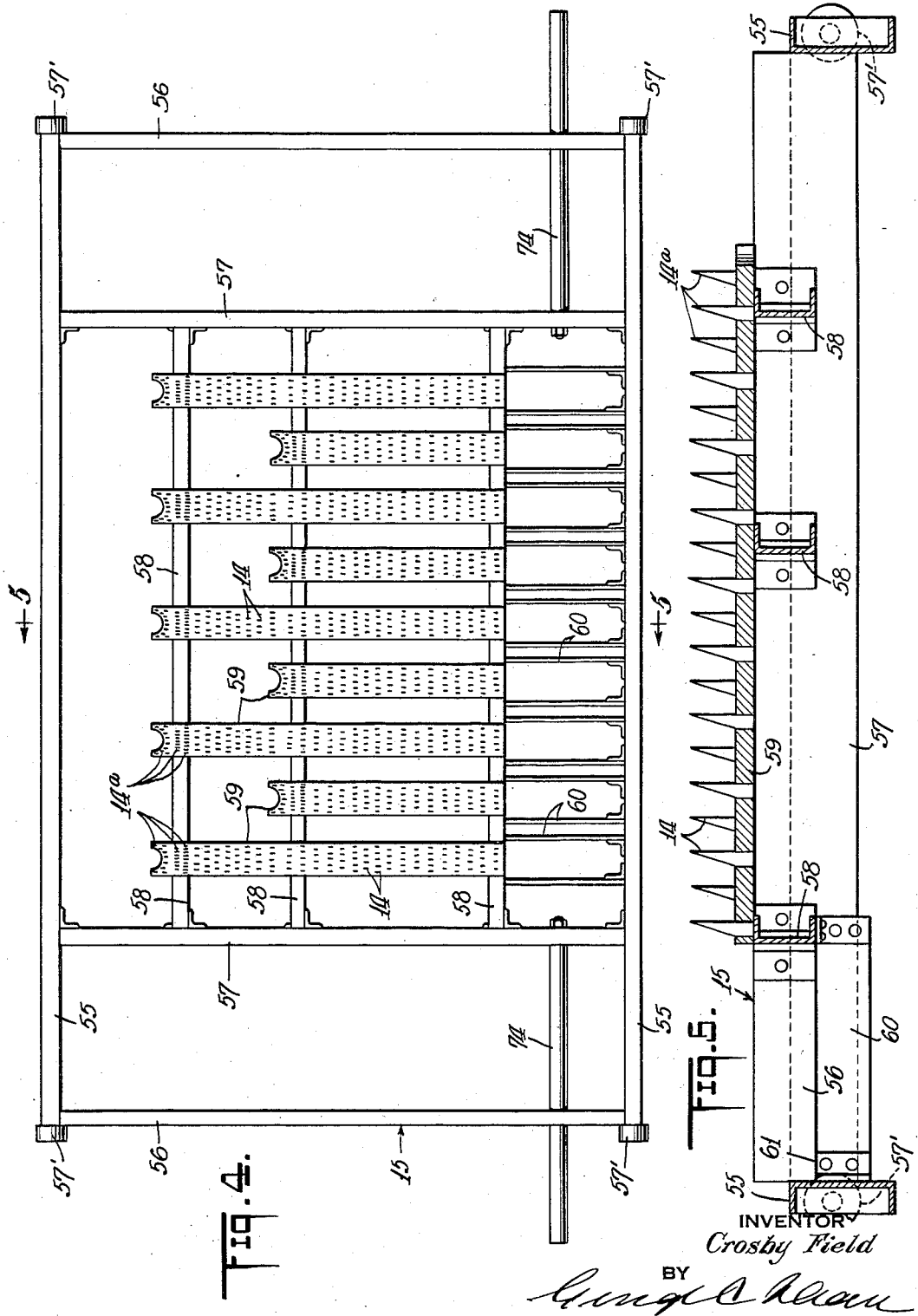
INVENTOR
Crosby Field
BY
ATTORNEY Aug. 27, 1935.  C. FIELD  2,012,908
METHOD OF AND APPARATUS FOR HANDLING AND SHAPING METAL WOOL
Filed Nov. 16, 1932    11 Sheets-Sheet 5
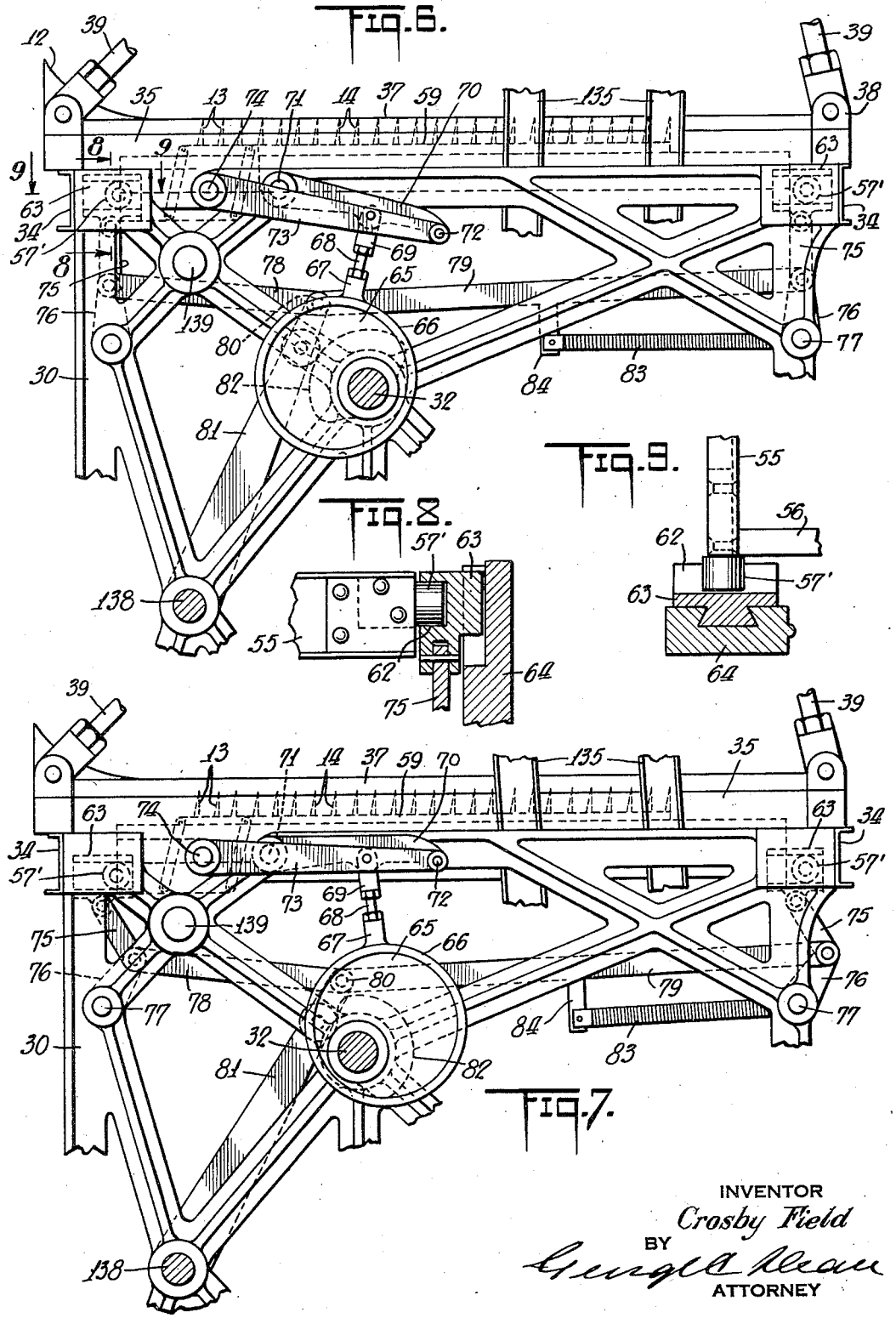
INVENTOR
Crosby Field
BY
ATTORNEY INVENTOR
Crosby Field Aug. 27, 1935.  C. FIELD  2,012,908
METHOD OF AND APPARATUS FOR HANDLING AND SHAPING METAL WOOL
Filed Nov. 16, 1932  11 Sheets-Sheet 7
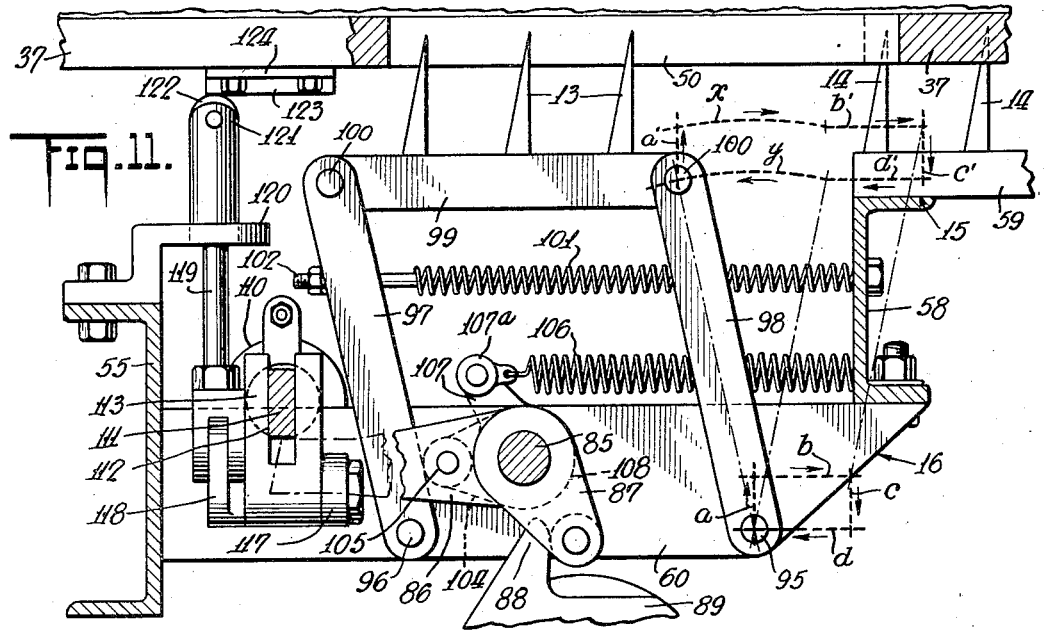
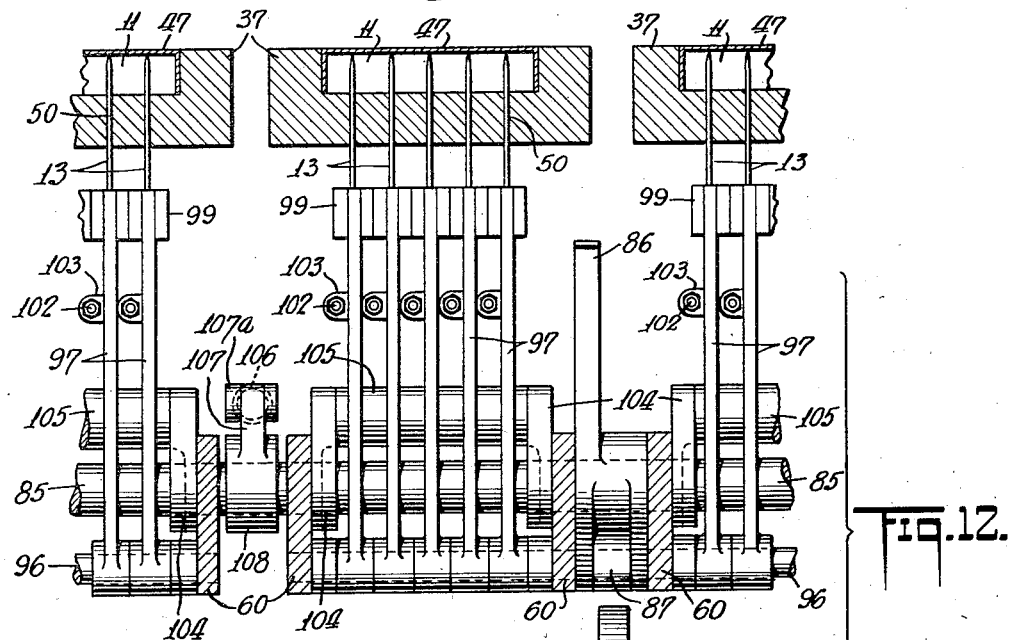
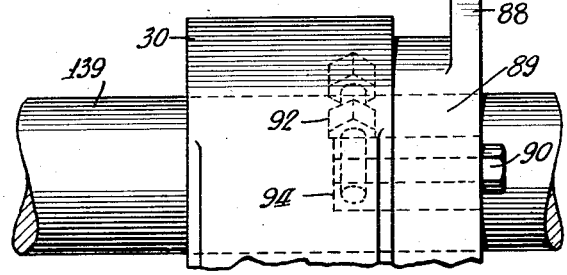
INVENTOR
Crosby Field
BY George C. Reeve
ATTORNEY

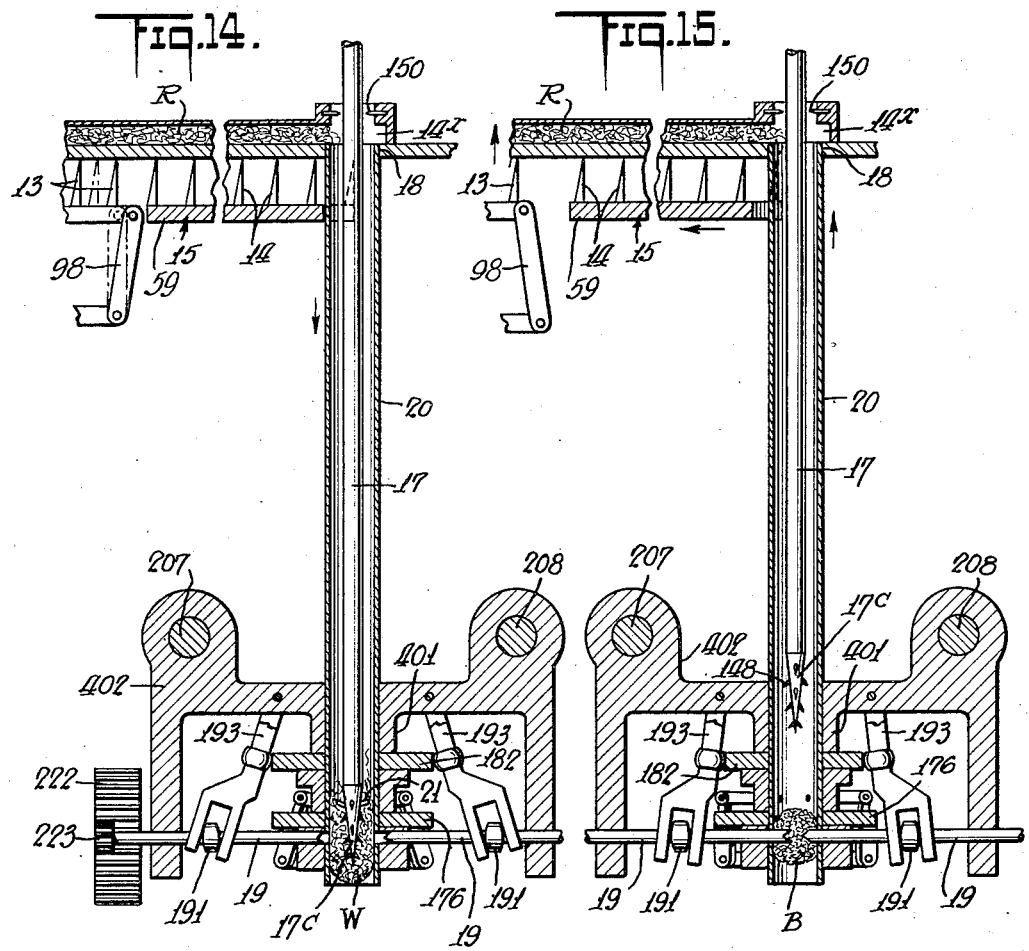

Aug. 27, 1935.  C. FIELD  2,012,908
METHOD OF AND APPARATUS FOR HANDLING AND SHAPING METAL WOOL
Filed Nov. 16, 1932    11 Sheets-Sheet 9
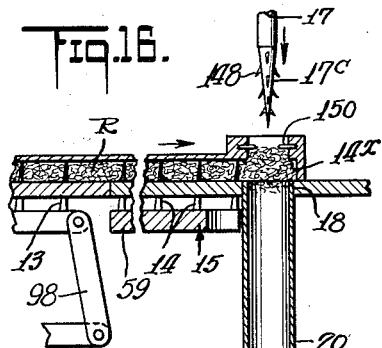
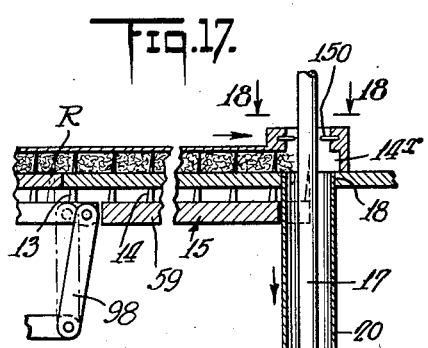
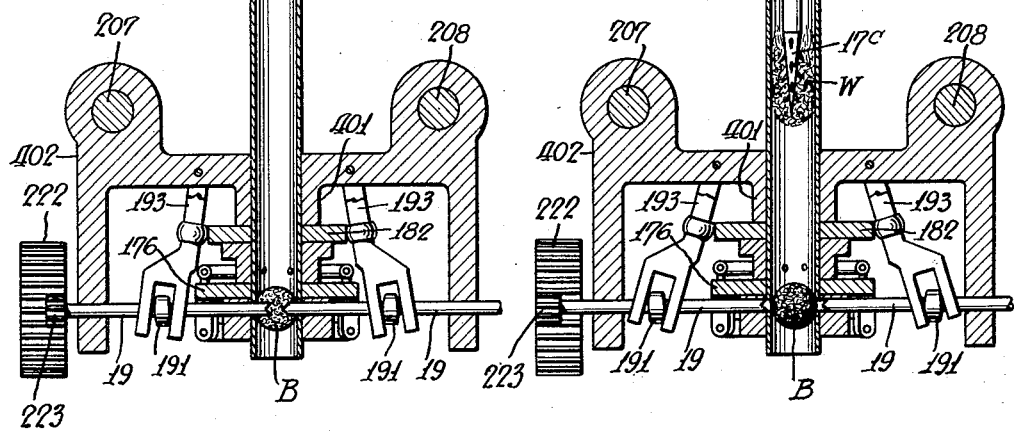
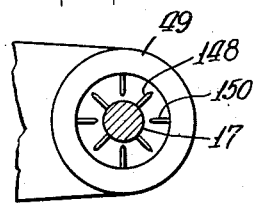
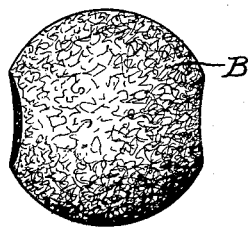
INVENTOR
*Crosby Field*
BY
*George C. Ahearn*
ATTORNEY

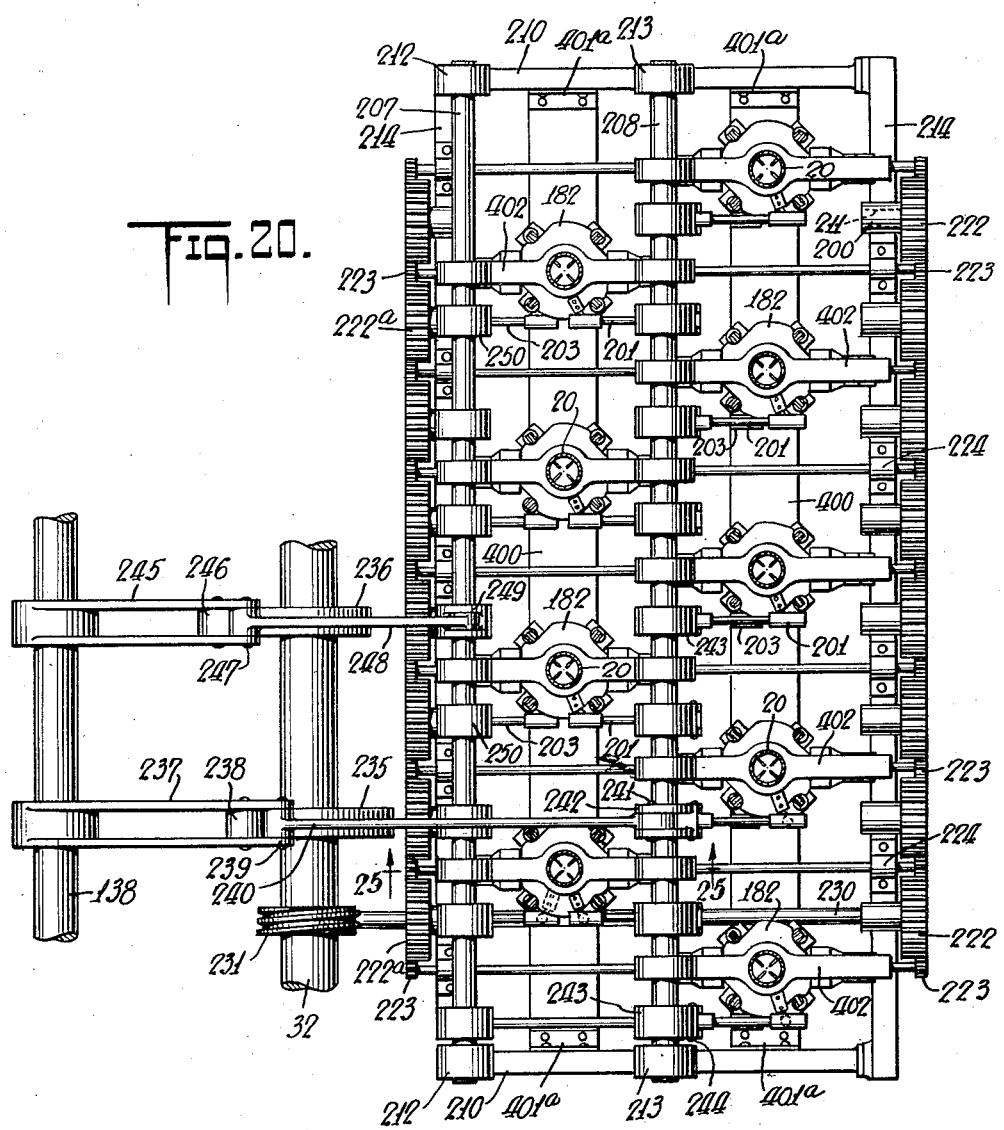

Aug. 27, 1935.  C. FIELD  2,012,908
METHOD OF AND APPARATUS FOR HANDLING AND SHAPING METAL WOOL
Filed Nov. 16, 1932  11 Sheets-Sheet 11
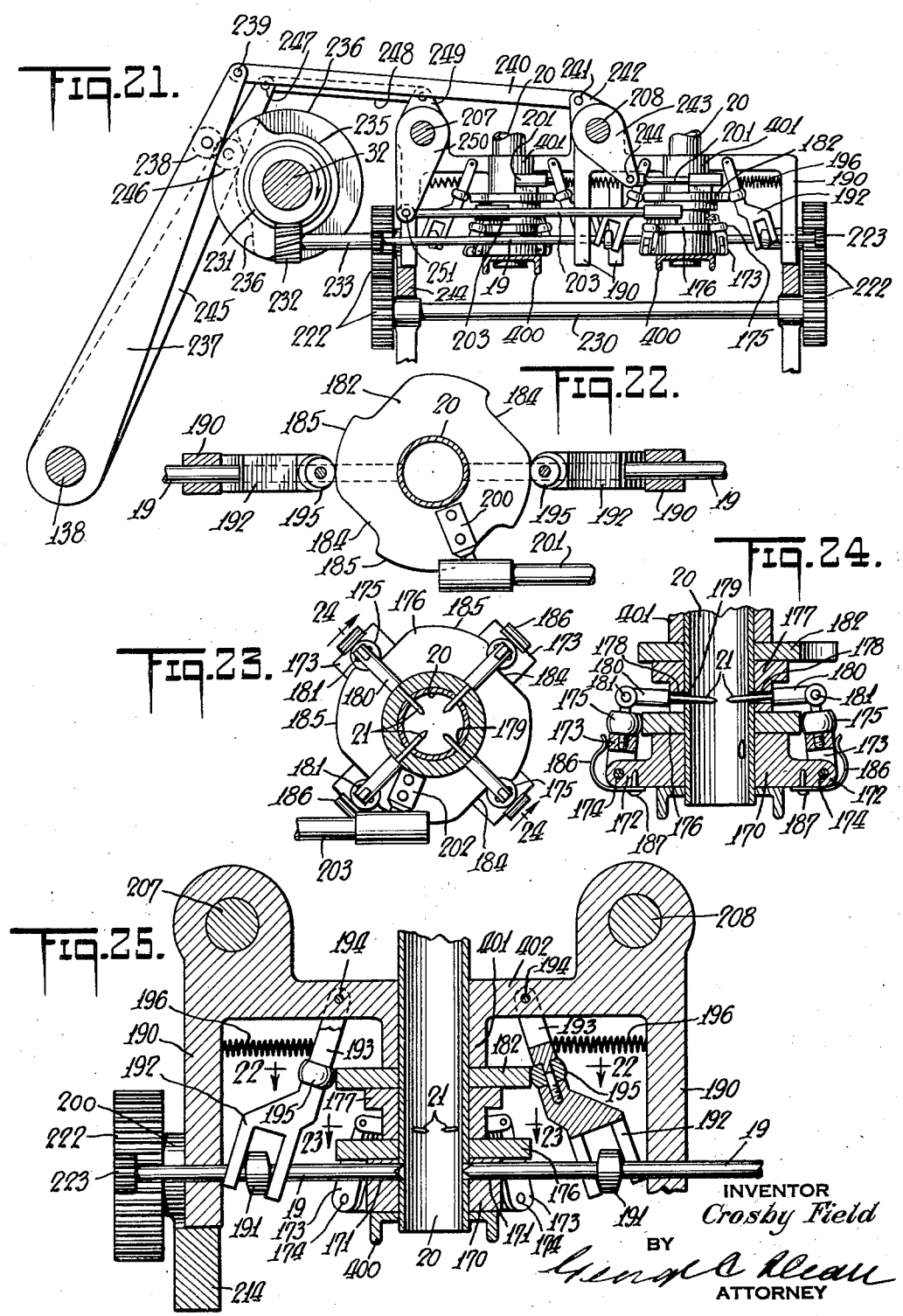
INVENTOR
Crosby Field
BY
ATTORNEY Patented Aug. 27, 1935

2,012,908

UNITED STATES PATENT OFFICE 2,012,908

METHOD OF AND APPARATUS FOR HANDLING AND SHAPING METAL WOOL

Crosby Field, Brooklyn, N. Y.

Application November 16, 1932, Serial No. 642,897

18 Claims. (Cl. 29—1)

My present method and apparatus were devised primarily for handling metal wool and for forming it into balls or rolls of standard shape and approximately uniform densities, even where the supply of wool is of somewhat varying density; and an important object has been to provide means for effecting these operations by automatic means, but it will be obvious that various features of my invention are applicable in other relations and for other purposes.

In present commercial practice, the wool is formed from wire by serrated cutting knives, the serrations varying from, say, 200 per inch down to 50 per inch, according to the grade of wool to be cut thereby. In any event, the fibres are of extremely minute cross-section and are more or less curly as well as springy, and considerable numbers of fibres cut by adjacent serrations are more or less intertwined in long strands, which often include knotted or matted portions. These fibres and strands collect in fluffy masses.

Heretofore the uniformity of both the density and size and shape of the product has been dependent entirely on the skill of the operator in manually plucking the right amount of wool from the supply bundle and manually shaping it into a small crude ball or roll of approximately the size and shape required. Even experienced operators were not able to produce balls or rolls of very uniform density or thickness because, however skillful the operator might be in judging the quantity of wool, each portion is so light that judgment of uniformity of its weight is extremely difficult; the more so because of the irregular density and the sometimes matted condition of various portions of the wool supply. Because of the stubborn, springy quality of the fibres, it is impractical to manually fluff out and uniform the denser portions.

The problem of securing sufficiently uniform density is complicated by the fact that it is undesirable to subject the wool either to cutting operations or to compacting pressures beyond the elastic limit of the fibres, because the presence of an excessively large number of broken strands and projecting ends in the completed product is undesirable on account of the danger of scratching or pricking the fingers of the user.

Furthermore the operation of manually rolling or balling the small bunches of wool plucked from the supply serves to accentuate rather than remedy any non-uniformities of density which may exist. Tangles and mats in the wool remain, and are but ill concealed by rolling and compacting which takes place under manually applied pressure. Such mats and lumps in fact make it difficult to roll the small bundle of wool into even nearly true spheres or cylinders. The further pressure subsequently applied when these balls or rolls are used as abrasives or cleansers tends to quickly reduce them to shapeless wads, matted in some places and loose and stringy in others.

It is among the objects of the present invention, therefore, to provide a method and apparatus for utilizing the large non-homogeneous bundles of wool as they come from the wool making machines, and after but slight manual preparation, subjecting them to what might be called a mechanical homogenizing process, that is to say, a process that renders the density of the wool substantially uniform. I then segregate small uniform quantities of wool from this uniformly dense product and form them into rolls or balls or pads of correct size and shape. These results are accomplished without resorting to the use of heavy pressure or shearing mechanism.

Another object is to provide a machine for such purposes, which is fully automatic, except for a simple preliminary operation wherein the bundles are elongated and thinned into crude, non-uniform relatively thick strips or ribbons, which are continuously supplied to the intake end of the machine. This operation affords ample opportunity for inspection and rejection of nonuniform or otherwise defective or dirty wool, as well as any foreign matter.

Another object is to provide such a machine in which the operation of homogenizing the inspected but crude, non-uniform supply into a continuous strip or ribbon of uniform density and cross-section; and the further operations of subdividing the ribbons, spinning the segregated portions and ejecting the completed articles, may be accomplished with great rapidity.

Insofar as the problem of taking this crude ribbon of wool and rendering its density uniform is concerned the present method and apparatus follow substantially or identically the principles disclosed in my copending application Serial No. 557,630 filed August 17, 1931.

Such application discloses mechanism for feeding a continuous length of manually formed supply strip into and through a constricting tunnel by needles mounted in intermittently acting four motion feed mechanism (the exact action of which will be later described) whereby the cross section and density of the strip are rendered uniform. Also in manner similar to that described in my prior application the leading end of the ribbon is delivered to a tearing mechanism at the discharge end of the tunnel where predetermined wads are torn off by a barbed dart reciprocating at right angles to the direction of travel of the wool ribbon and delivered to the forming mechanism.

Here it is stripped from the dart upon the retracting stroke of the latter. As the wad is released from the strippers a pair of rapidly rotating needles enter it from opposite sides and spin it into a ball or roll the size and shape of which is predetermined by the cross sectional shape of the chamber. One formed roll or ball is ejected from the chamber when the next wad of wool is carried thereinto by the dart.

The density and volume of the wool presented by the feed mechanism being substantially the same for each stroke of the dart, the wool pulled off is very closely the same both in volume and weight. This measuring by tearing avoids any clean cut directly through the ribbon such as would sever the spiral fibres into many small pieces.

A compact arrangement for unitary operation includes a large number of parallel troughs or tunnels, with unitary driving means for their four-motion feeding arrangements terminating alternately in two banks of dart and forming mechanisms.

Figure 2:
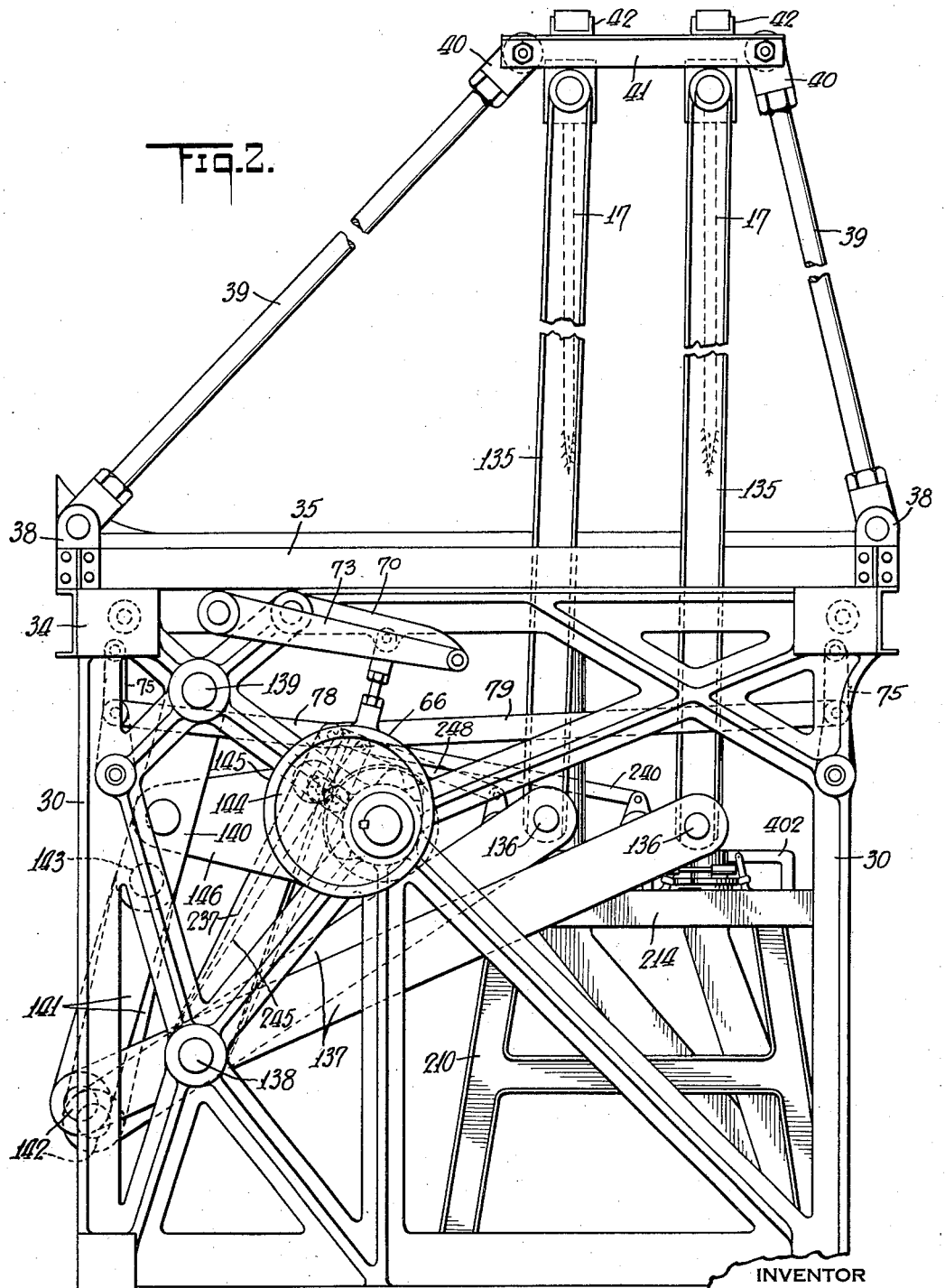
Figure 3:
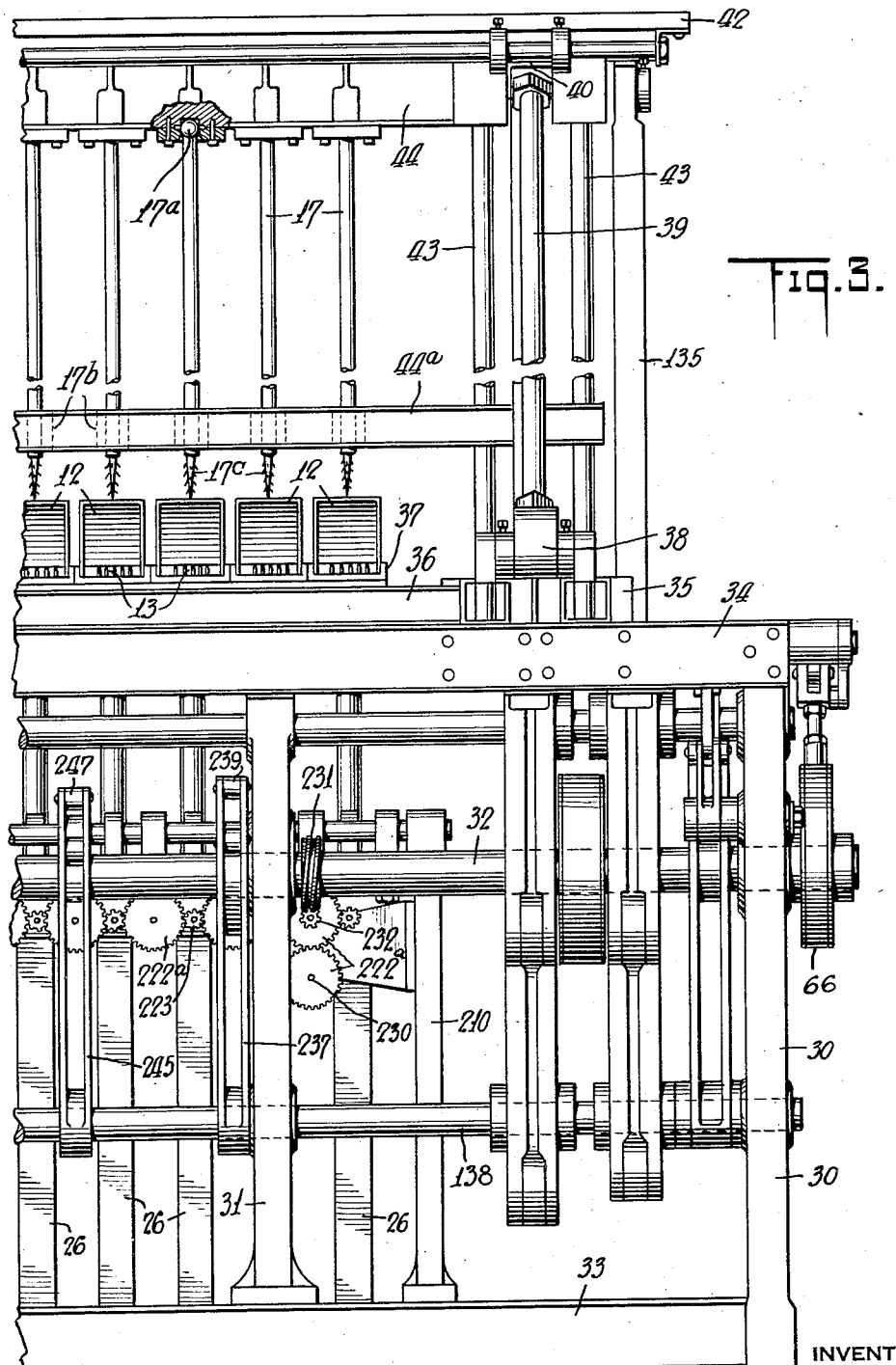
Figures 10, 13:
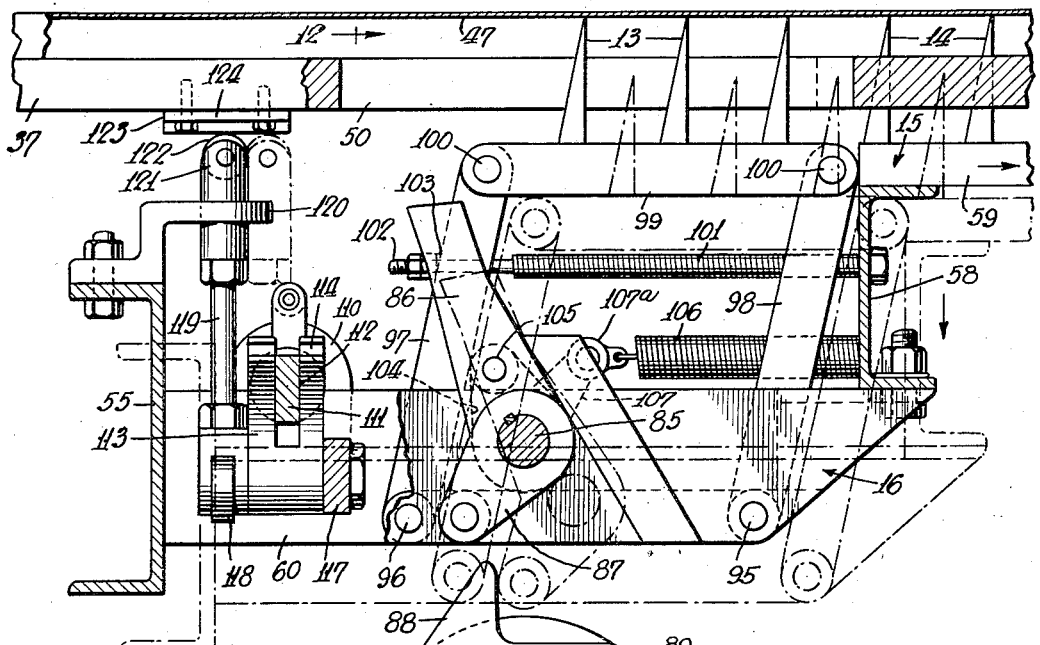

The above and other features of my invention will be more evident from the following description in connection with the accompanying drawings, in which Fig. 1 is a somewhat schematic view in vertical longitudinal section, disclosing diagrammatically series of mechanisms which successively operate upon the wool from the time it enters the machine as a crudely formed ribbon, until it leaves the machine as a formed ball, Fig. 1a is a fragmentary plan view of one of the tunnel entrances, Fig. 2 is a side elevational view or end view of the machine, Fig. 3 is a fragmentary rear elevational view of the machine, Fig. 4 is a plan view of the movable table which mounts the wool conveying needles, Fig. 5 is a transverse sectional view therethrough, taken approximately on the line 5—5 of Fig. 4, Fig. 6 is a side elevational view illustrating the mechanism for operating the needle carrying table, this view showing the table just at the start of the feeding stroke thereof, Fig. 7 is a view similar to Fig. 6 but illustrating the position of the table and its actuating mechanism after the completion of the feeding stroke and after the table has been lowered and is ready to be retracted prior to reentry of the needles into the material, Fig. 8 is an enlarged sectional detail on the line 8—8 of Fig. 6, Fig. 9 is a sectional detail on the line 9—9 of Fig. 6, Fig. 10 is an enlarged side elevational view of the packer needle mechanism showing in full lines the position of this mechanism subsequent to release of the springs; and in dotted lines, the position of the mechanism when the packer needles have been completely retracted from the wool, Fig. 11 is a view similar to Fig. 10, but illustrating the position of the parts at the end of the retracting stroke and just as the packer needles are about to begin their upward movement to reenter the wool ribbon, Fig. 12 is a rear elevational view showing several sets of packer needle mechanism and taken approximately on the line 12—12 of Fig. 10, Fig. 13 is a view of the packer needle latch mechanism taken approximately at right angles to the showing of such mechanism in Figs. 10 and 11, Fig. 14 is a vertical sectional view showing the dart in its lowermost position after having torn a wad of wool from the ribbon and carried it into the forming chamber and showing the stripper needles moved inwardly ready to strip the wool from the dart when the latter rises, Fig. 15 is a similar view but showing the dart starting on its upward stroke, the stripper needles retracted and the balling needles engaged with the wad, Fig. 16 is a similar view but showing the position of the parts with the dart fully retracted, the ball completely formed and the wool ribbon advanced to again bring its leading end under the dart, Fig. 17 is a similar view showing the position of the parts when the dart is carrying a new wad into the forming chamber and the previously formed ball, now released by the balling needles and ready for discharge through the open bottom of the chamber, Fig. 18 is a plan view of the tear tube and its stationary strippers taken on line 18—18 of Fig. 17, Fig. 19 is an enlarged perspective view of the formed ball, Fig. 20 is a sectional plan view of the battery of wad stripping and ball forming mechanisms, Fig. 21 is an end view thereof, Fig. 22 is a sectional plan view of the balling needle cam and associated mechanism taken on the line 22—22 of Fig. 25, Fig. 23 is a similar view of the stripper needle cam and its related mechanism taken on the line 23—23 of Fig. 25, Fig. 24 is a vertical sectional detail on line 24—24 of Fig. 23, and Fig. 25 is a vertical sectional view through one complete stripping and forming unit taken on the line 25—25 of Fig. 20.

General operation

The relation of the complete train of mechanism which successively operates on the steel wool from the time it enters the machine until the time it leaves it in the form of properly shaped balls or rolls of material is illustrated schematically in Fig. 1.

The operators place the crudely hand formed steel wool ribbon R on a conveyer belt 10 at the rear of the machine. In order to maintain the greatest uniformity of density in the finished product, the hand shaped ribbon should preferably have a density of between one-half and twice the density of the finished product, the automatic mechanical homogenizing action of the packer needle mechanism being capable of conveniently converting a ribbon kept within these limits into a ribbon of substantially uniform density.

From its belt 10, each ribbon R passes into its tunnel 11 through the flaring mouth 12 thereof (Fig. 1a). In each tunnel a set of feed needles 14 is fixed on a table 15, which, with base plate 16, has a four-way movement indicated by schematic lines a, b, c, d, (Fig. 11). A cooperating set of packer needles 13 is yieldably mounted on base plate 16, so that said packer needles have an independent longitudinal movement superposed on the four-motion feed of said table 15. The latter movement brings all needles 14 and 13 into feeding engagement with the wool but needles 13 are under spring tension and operate to homogenize the wool and then press it forward against needles 14.

The base 16 and table 15 cause the needles 14 to trace the rectangular path $a$, $b$, $c$, $d$, (Fig. 11). They all move along lines parallel with $a$, upwardly through slits in the tunnel bottom and impale the ribbon. They then move forwardly to advance the ribbon parallel with $b$. They then withdraw downwardly parallel with $c$ and move back through a horizontal path, parallel with $d$, ready for another up thrust to again reenter and impale the ribbon at a new point and advance it another step.

The packer needles 13 have similar movements except that their horizontal movement is through a greater range and except that they are non-positively impelled through separate springs. That is to say, when the two sets of needles have been entered into the mass, the packer needles which have been previously latched against the tension of their actuating springs are suddenly released and their springs draw them swiftly forward, each to a point determined by the increasing density (resilience) of the wool which it compresses against the rearmost conveyor needles 14. After this spring actuated compression stroke of these needles 13 has been completed, they move forward together with the conveyor needles 14 and assist in advancing the ribbon.

Continuing the general description of operation in connection with Fig. 1, it is to be noted that as the ribbon reaches the end of the tunnel after a forward feed stroke (Fig. 16), a barbed dart 17 moves downwardly through a tear tube 18 in the tunnel bottom, carrying with it a wad of wool from the end of the ribbon (Fig. 17). This wad is deposited in an open-topped, open-bottomed forming chamber 20 here illustrated as a cylinder. As the dart 17 starts its upward motion, stripper fingers 21 (Fig. 14) work through the wall of the cylinder 20, stripping the wool wad from the dart. After the dart withdraws, stripper fingers 21 also withdraw and simultaneously the rotating balling needles 19 move into the forming cylinder, pinching the wad between them and spinning it into the spherical form (Fig. 19) which is determined by the circular cross section of the forming chamber. Just before the dart reaches its lowermost position with a new wad of wool, the spring needles withdraw, thus freeing the previously formed ball which is then ejected by the new wad. The ejected ball B slides down the chute 26 and is carried off on the conveyor belt 27 to its point of inspection and packing.

*Machine frame work (Figs. 2 and 3)*

The machine includes a pair of upright end frames in the nature of skeleton castings 30, which cooperatively with any suitable number of standards 31, provide bearings for the main shaft 32. Castings 30 at their lower ends, are preferably connected by one or more substantial cross beams 33 upon which the standard or standards 31 are mounted and the upper corners of the end castings 30 are connected by suitable longitudinally extending massive channel bars, such as 34, the latter in turn being rigidly united by horizontal frame bars 35.

Mounted upon the tops of the channel bars 34, are longitudinally extending channel frames 36, of less massive construction. Extending fore and aft of the machine and with their ends mounted on the frame bars 36, are a plurality of up-turned channel pieces 37 arranged in laterally abutting relationship. The rear portions of these channel pieces cooperate in forming the tunnels through which the ribbons of metal wool are passed during the operation of the machine, but in addition to this function, the members 37 add generally to the rigidity of the structure.

Rising from the upper forward and rear corners of the machine and connected to suitable brackets 38, are braces 39, the enlarged upper ends 40 of which are bolted to horizontal rigid angle iron cross pieces 41 disposed well above the channel bar plates 37. The ends of the frame members 41, near their point of junction with the rods 39, are connected by the longitudinally extending rigid frame bars 42, two of these bars being employed and arranged one behind the other. Each of the bars near its end provides a rigid point of attachment for the upper end of a vertical guide rod 43. Travelling upon these guide rods, are a pair of cross heads 44, each carrying a set of darts 17. The darts are guided through suitable sleeves 17b in longitudinally extending guide frame bars 44a carried by standards 43. The darts may have ball joints 17a (Fig. 3) at the cross heads, such joints being pinned to prevent axial rotation.

The main shaft 32, which has been previously referred to, is driven from any suitable source and upon this shaft, are mounted the cams which directly or indirectly control the actuation of nearly all of the operating parts of the machine, such for instance, as the packing needles, the movable needle table, the cross heads and their darts, the stripper fingers 21 and the balling needles 19. Due to the considerable number of levers and cams and links and shafts which are employed to operate these various mechanisms from the main shaft, the modus operandi of the various parts can be better understood from separate detailed illustrations thereof.

*The tunnels (Figs. 1 and 1a)*

The bottoms of the tunnels 11 are preferably formed by the upwardly facing channel pieces 37, and complementing these channel pieces are the hood portions 47, which are provided with the flaring mouths 12 above referred to and with flanged sides fitting within the channel pieces 37 and extending from the rear thereof to a point adjacent the discharge openings in the channels, the openings constituting the mouths of the tear tubes 18. The hoods terminate abruptly against an abutment plate 48, constituting part of a collar 49 through which the darts 17 pass.

The channel members 37 are provided with a longitudinally extending series of slots 50, through which the packer needles 13 and the conveyor needles 14 work to engage and operate upon the ribbon of wool.

*The conveyor needles and their supporting and operating mechanism (Figs. 4 to 9)*

The first needles to operate upon the wool, as it enters the tunnels, are the packing needles 13 which serve to render the density of the wool substantially uniform. Inasmuch, however, as the special mechanism for these needles is carried by the same table as that which bears the conveyor needles, the invention may be more readily understood by describing the details of this table and its mode of operation.

The table which is shown in top plan view and longitudinal section in Figs. 4 and 5 respectively, includes a relatively large rectangular frame consisting of the front and rear frame members 55 and the side frame members 56. The extended ends of the bars 55 are provided with rollers 57. Inwardly of the bars 56, are bars 55 connected by frame members 57, parallel with bars 56. The members 57 are connected by any suitable number of longitudinally extending frame bars 58, which provide a support for the table plates 59, which carry the sets of staggered conveyor needles.

The rearmost of the cross frame bars 58 is connected to the rear frame bar 55 by a series of vertically disposed plates 60, which as will be noted in Figs. 10 and 11, serve to mount the carrying mechanism and actuating mechanism for the packer needles 13.

Two sets of plates 59 of different length are shown, one set consisting of five plates and the other of four. The needles 14 are fixedly mounted upon the plates and work through the slots in the tunnel bottom as previously described. The mechanism for actuating the table consisting of the various frames 55, 56, 57 and 58 and the plates 59, and for correspondingly actuating the members 60, which are secured by brackets 61 to the bars 55, and 58, may be best seen from Figs. 6 to 9 inclusive.

The rollers 57' are arranged to travel in horizontal grooves 62 in blocks 63, the latter in turn sliding in blocks 64, fixed to the upper corners of the end frame castings 30 of the machine. The mechanism for imparting the desired fourway motion to the table so that the conveyor needles may perform their function of intermittently advancing the ribbons through the tunnels, consists of means for periodically, vertically, reciprocating the blocks 63 and intermittently horizontally reciprocating the table with respect to the blocks.

The desired fore and aft movement is imparted to the needle carrying table through the instrumentality of an eccentric 65 fixed upon the main shaft of the machine and rotating within a circular collar 66, having a lug 67 connected by bolt 68 or otherwise to an extension 69 of a lever 70 pivoted at 71 on the end casting 30. The free end of the lever 70 is pivotally connected at 72 to the free end of a lever 73 fulcrumed on a shaft 74, projecting laterally from the table structure. Two sets of eccentrics and levers are provided for coaction with the two shafts 74, which as seen from Fig. 4, are rigidly mounted in the frame bars 56 and 57, and project laterally therebeyond.

It will be apparent that inasmuch as the pivot 71 is fixed to the frame and the pivot 74 fixed to the movable table, the operation of the eccentric tends to alternately increase and lessen the distance between the pivot points 74 and 71 and thereby impart the desired horizontal, translational movement to the table, such motion being permitted by the arrangement of the rollers 57' in the grooves 62.

The mechanism for imparting the up and down motion to the table, includes pairs of toggle levers arranged at the corners of the machine. One toggle lever 75 of each pair, is pivotally connected at one end to one of the blocks 63, the other toggle lever 76 of each pair has a stationary pivot as at 77 on the end casting and its free end is connected to the opposite toggle 75.

A pair of links 78 and 79 have a common pivot 80 at the free end of a lever 81, actuated by a cam 82, turning with the main shaft of the machine. The ends of the levers 78 and 79, are connected respectively to front and back pairs of toggles 75, 76, and a spring 83 anchored at one end of the machine frame, is connected to an arm 84 on the lever 79, tending to draw the latter to the right and thereby maintain lever 81 against its cam. It will be apparent that, as the lever 81 is engaged by the low side of its cam, the spring 83 draws levers 78, 79, to the right collapsing the toggles and drawing the blocks 63 downwardly. As the lever strikes the high side of its cam, however, the levers 78, 79, are drawn to the left, straightening out the toggles and elevating the blocks 63. By this motion the table is raised and lowered, blocks 63 sliding in the block 64. It will be understood of course that the timing of eccentric 65 and cams 82 is such that the two reciprocating motions alternate. That is to say, the table moves first upwardly, then forwardly, then downwardly and then rearwardly, as indicated by dotted lines $a, b, c, d$, Fig. 11.

*The packing needles and their operating mechanism (Figs. 6, 7 and 10 to 14)*

The series of fore and aft extending plates 60 serve to provide bearings for a rock shaft 85. Fixed upon this shaft, is a latch arm 86, provided with a tail piece 87, adapted for coaction with the projecting portion 88 of a stationary cam 89, which is bolted or otherwise secured at 90 upon the fixed frame work 31 of the machine, the bolts passing through slots 91 to accommodate for slight adjustment of the cam, and the latter being locked against movement when in adjusted position by a screw 92, working through a flange 93 of the frame work and engaging the flat face 94 of a projection on the cam.

A pair of cross pins 95 and 96 mounted in plates 60 provide pivotal fulcrums for the lower, apertured ends of pairs of sets of parallel links 97 and 98, the upper ends of these sets of links being connected to common horizontal links 99 by the cross pins 100. The horizontal link members 99 are the elements which carry the upwardly projecting packing needles 13.

Coiled contractile springs 101 anchored to the frame member 58 and acting on spring tension adjusting screws 102 carried by brackets 103, fixed to the links 97, normally tend to swing these links to the right from the position of Fig. 11 through an arc, $x$, shown in dotted lines, toward the position shown in Fig. 10.

The links 97, 98 and 99 are arranged in sets of five at each tunnel, and there are three needles 13 on each link, so that there are fifteen packing needles acting on the wool at the mouth of each tunnel. The spacing of the plates 60 is preferably such as to accommodate one set of links between each adjacent pair of plates. Levers 104, fixed upon the rock shaft 85 carry rollers 105. These rollers 105 serve to engage links 97 and swing them to the left along arc $y$, at times when the rock shaft is rotated in counterclockwise direction by the engagement of the latch tail piece 87, with its associated cam 88.

A spring 106 normally tends to urge the latch to the position of Fig. 10, this spring being anchored to the frame plate 58 at one end and at its opposite end, being connected to lug 107a, pivoted on a crank arm 107, projecting from a collar 108, fixed on the rock shaft 85.

As the main needle table is shifted rearwardly to the position of Fig. 11, the latch 86 is swung downwardly by the engagement of member 87, with the cam 88, the downward movement of the latch tending to rock the shaft 85, thereby rocking the links 104 and their connected arms 105 in counterclockwise direction to the shaft, the cross bars 105 during this motion, acting to swing the links 97 to approximately the position of Fig. 11 and to tension the actuating springs 101, the tension of which regulates the force with which the packer needles work against the wool when these needles are released after having been elevated to the position of Fig. 10. With the parts in the position of Fig. 11, however, the needles are still below the table and keeper mechanism is provided to engage and retain the latch 86 during the upward movement of the needles into engagement with the wool. Such mechanism is shown in Figs. 10, 11 and 13.

The mechanism for restraining movement of the latch 86 during upward movement of the needles 13 and for subsequently releasing the latch so that the packing needles may be drawn forward by their springs 101, includes a pair of guide members 110, fixed upon a pair of adjacent frame bars 60 and providing a slidable mounting for a keeper bolt 111. The intermediate portion of this bolt is flattened as at 112, and straddled by a bifurcated lever 113, the furcations of the lever being recessed or slotted as at 114 to accommodate a pin or stud 115, extending through the center of the keeper bolt.

That end of the bolt which serves as the keeper is provided with a cam face 116 to be engaged by the latch arm 86 as the latter is rocked with the shaft 85 into depressed position. The fulcrum of the lever 113 is on a cross bar 117 connecting adjacent plates 60 and fixed to rock with the lever is the link 118, the free end of which is pivotally connected to the lower end of a plunger member 119, vertically guided in an apertured angle bracket 120, carried by the frame bar 55. The bifurcated top 121 of the plunger rod, mounts a roller 122, which rides on the rail 123 of a small bracket 124, bolted to the under face of the table 37.

In order to maintain the roller 122, pressed against its track 123, a coiled contractible spring 125, connects one of the bearing pieces 110, with an upstanding pin 126 fixed to the latch bar. The spring acts to draw the latch bar to the right (Fig. 13), thereby rocking the lever 113 to the right and elevating the plunger. As the latch bar 86 is swung downwardly from the position of Fig. 10 to the position of Fig. 11, and engaged under the keeper bolt 111, such bolt is temporarily forced rearwardly by the action of the latch bar on cam surface 116 and the roller 122 is temporarily withdrawn from engagement with the rail 123. But it is immediately snapped back by the spring 125, as soon as the latch bar has reached the position of Fig. 11.

With the parts in the position of Fig. 11, the table 59 and the structure which is rigid therewith, including the frame plates 60, is ready to rise. On the upward movement of the table, it will be apparent that the bracket 120 moves upwardly with respect to the plunger 119, as the result of which the lever 118 is swung downwardly and the lever 113 is swung to the left, withdrawing the keeper bolt so that as the upward movement of the packing needles is completed, the latch 86 is suddenly released, permitting spring 106 to urge the latch to the position of Fig. 10 and carrying cross bar 105 out of the way of members 97. This leaves the springs 101 free to draw the needle carrying bars 99, smartly to the right.

Each of the five needle carrying bars of a set is independently movable on this spring impelled packing stroke, to the end that needles acting upon the wool of less density can move forward more easily and farther than those acting on the denser wool and the repeated impaling and pressing action thus effected renders the ribbon of substantially uniform density. The elements as well as sum total of possible movement of needles 13 are diagrammed in Fig. 11 by dotted lines $a'$, $b'$, $c'$, $d'$, $x$, $y$, but the actual range of fore and aft, wool-advancing movement of the packer needles ($x$ plus $b'$, Fig. 11) will exceed the advancing movement $b$ of the conveyor needles 14 only to an extent dependent upon the length of the throw of the bar 99 along arc $x$. This depends on density (resilience) of the measured length of wool previously deposited between adjacent needles 13 and 14; and this in turn will depend on the varying length and the average cross-section times density of each portion of new supply strip that was taken in by the needles 13 on the preceding forward stroke.

The timing of the carrier needle motion with the conveyor needle motion, i. e., the motion of the main needle table is as follows: The conveyor needles and packer needles move downwardly together. As they move to the left together, an added effective translatory motion is imparted to the needle bars 99 through the intermediacy of the actuating members 105, which are controlled by the rock shaft 85. As the parts reach their extreme left hand position, shown in Fig. 11 it will be seen that the packer needles have moved considerably further than the conveyor needles and the packer needles are now latched. The two sets of needles move upwardly together into engagement with the wool, whereupon the latch mechanism which controls the packer needles is released. The latch is smartly retracted by the relatively strong spring 106, thus withdrawing members 105 and leaving the packer needles free to snap forwardly under the action of the springs 101. After needles 13 have completed their spring impelled stroke they are advanced forwardly with conveyor needles 14 (due to the fact that both sets of needles are mounted on the common carrier mechanism) and the ribbon of wool is advanced one step. In other words, that throw of the packer needles which is effected by the springs 101, is entirely an excess throw for the purpose of stringing out the wool variably, according to its density, to make it uniform; and then uniformly compacting it against needles 14. This motion is of course superposed on the further motion of the needles with the table 16, which advances the ribbon through the tunnel.

As before explained, the lag and lead of adjacent independently spring pressed needles causes those engaging denser wool to lag behind, out of lateral registry with neighboring needles engaging less dense portions, and this will permit the denser wool to partly stretch and partly slip laterally out of the path of the needle that is pushing it, so that the denser remnant may lag behind and be operated upon more than once during successive forward movements of the spring pressed needles. Moreover, the so-called needles are preferably thin tapered blades having their front edges vertical. Consequently, every time one of these needles penetrates a dense spot, it splits and stretches it lengthwise of the ribbon and the swift spring impelled forward movement of the needle applies additional longitudinal stretching and tearing tension. All the movements are relatively short so that the above actions are repeated several times on the same lengths of wool ribbon.

While the needles 13 have been properly called "packing needles", this expression necessarily implies that they are "measuring" needles, because their "packing" movement being by spring pressure, they pack a variable length of standard density wool in the space between front needle 13 and rear needle 14 (Fig. 11); and this variably shortened travel of needles 13 along arc $x$, will necessarily "measure" the length of new supply strip that they will engage and feed forward on the next forward stroke. For instance, if the volume and density of a given portion of supply strip happened to be great enough, the needles 13 might press forward only half the arc $x$, in which case the length of new supply strip which they will measure off on the next stroke, will be length of line $b'$ plus only one-half arc $x$, etc. In this connection, it is to be remembered that there is some resistance to forward drag of the supply strip by needles 13, and their forward spring movement being relatively sudden, there will be some stretching of the supply strip in the rear of needles 13; which explains why the supply strip may vary in cross-section times density, from twice to half that required for the final ribbon.

*Darts and their operating mechanism (Figs. 1, 2 and 14 to 17)*

As seen in Figs. 14 to 17, the tear tubes 18 in the bottom of the feed tunnel 37, through which the leading end of the ribbon is carried downwardly by the darts 17, are in vertical alignment with and may constitute the upper ends of the cylinders 20 in which the bundles of wool thus segregated are deposited. The dart movement therefore, is essentially a straight vertical reciprocating motion and it is controlled by the mechanism illustrated in Fig. 15.

Each cross head 44 is pivotally connected at each end to the upper end of a link 135 (Fig. 2) and these links in turn are pivotally connected at their lower ends as at 136 to the free ends of levers 137, pivoted upon a common fulcrum rod 138, intermediate their ends. Well above the fulcrum 138, there is provided a second fulcruming shaft 139, upon which are pivoted the upper ends of toggle levers 140. Associated toggles 141, pivotally connected as at 142, to the ends of the levers 137, have their ends pivotally connected to the free ends of the levers 140 as at 143. For breaking and straightening the toggles 140, 141, and thereby rocking the levers 137 about their fulcrums 138, to effect vertical reciprocation of the links 135 and the dart carrying cross heads 44 to which they are connected, I provide an eccentric 144 fixed upon the main shaft 32 of the machine. This eccentric is encircled by a ring 145, carrying a bracket 146 which is connected to the aligned toggle levers 140.

In order to accommodate for the different distances of the two sets of links 135, from their controlling eccentric, the two toggle links 141, 141, are of slightly different lengths, as are the two levers 137, 137, which they control. Fig. 2 shows in full lines, the extreme uppermost position of the cross heads and their actuating lever trains.

The darts 17 are preferably formed with tapered lower ends 17c and such ends are provided with a plurality of vertical rows of downwardly and outwardly inclining barbs or needles 148. As the darts move downwardly through the collars 49, that part of the ribbon which has been fed forward across the top of tear tube 18, is impaled by the dart on its downward stroke, and is carried with it into said tear tube. The wad of wool is held without slippage around the needles of the dart by being compressed between the dart and the sides of the tear tube 18; and the ribbon of wool is held in tunnel 11 by the closely set end needles 14 (Fig. 4). These needles are not permitted to start their downward withdrawal motion until after the dart has traveled far enough down in the tear tube to pull out or break off the fibers of the impaled wad W, from the ribbon R that is held stationary by needles 14. It will be noted that this free end of the ribbon includes a supported border portion around the unsupported portion that over-lies the tube 18. At the left it includes wool shown between the front holding teeth 14 and the tube 18; and at the right it includes an equal length that projects into recess 14$x$. When the dart engages the center of this area of ribbon, these border portions tend to fold back on the dart, thus contributing to the symmetry of the wad and the firmness with which it fits between the dart and the wall of tube 18.

The torn-off and somewhat compressed wad W is then carried by the dart into the associated cylinder 20 which constitutes a continuation of the tear tube. On the up stroke of the darts, the wad is stripped from the dart by the stripper needles 21, which work through the cylinder walls. As the dart rises, the forward motion of the needles 14 causes the ribbon to partly cover the top of tube 18 before the dart has had time to completely pass up out of collar 48, 49; and tendency of this wool to be carried up by the dart is corrected by providing the stationary stripper needles 150, which project radially inwardly from the collar 48. It will be understood, of course, that the rows of impaling needles on the darts are out of registration with the two sets of stripper needles 21 and 150 to the end that there will be no interference between these sets of needles. For a similar reason, the darts are firmly held in the cross heads 44, against rotation or twisting during their vertical reciprocation.

*Forming chamber arrangement*

Before discussing the details of the mechanism which actuates the stripper fingers and balling needles, reference may be had to Fig. 20 for a better understanding of the general arrangement of the individual cylinders or forming chambers. There are two rows of wad receiving cylinders arranged one behind the other and with the cylinders of each row staggered with respect to the cylinders of the opposite row. In the illustrated embodiment of the machine, there are five in the front row and four in the rear row, although it will be apparent that any desired number of cylinders might be utilized and the cylinders may all be arranged in a line if desired. The cylinders are encircled by collars 401 integral with fore and aft extending castings 402 (Fig. 1) carried by the cylinders and aiding to mount much of the forming mechanism. The particular arrangement herein illustrated, is conducive to compactness of the machine. The plan view of the conveyor needle table (Fig. 4) shows that the movable conveyor needle plates that serve the rearmost cylinders, are correspondingly shorter than those which serve the front cylinders, although all of the tunnel entrances are in the same line. This difference in length is unimportant because the only function that these table plates 59 and their needles 14 perform is purely a conveying function. The problem of homogenizing the wool and packing it into the tunnels in uniformly dense ribbons is taken care of entirely by the packer needles.

*Frame structure of the forming mechanism*

The mechanism which handles the segregated masses of wool after they are subdivided from the ribbons by the darts is supported upon a secondary frame structure which may be either fixedly or removably secured in position at the lower forward end of the machine. This frame structure (Figs. 2, 3 and 20) includes a pair of end frame members 210 consisting of uprights and horizontal cross pieces. The upper horizontal cross pieces 211 of the end frames 210 provide suitable bearings at 212 and 213 for the ends of a pair of longitudinally extending rock shafts 207 and 208 arranged respectively at the rear of and above the banks of forming chambers or tubes 20 which constitute continuations of the rear tubes. The end frames 210 are also connected by longitudinally extending frame members 214, the purpose of which will hereinafter appear.

A pair of longitudinally extending massive frame bars 400 are bolted or otherwise secured as at 401a to the upper cross pieces 211 of the end frame members 210, and may aid in supporting and lending rigidity to the tear tubes or cylinders 20.

*Stripper needles and balling needles and their mechanism (Figs. 14 to 17 and 20 to 25)*

The lower end of each forming chamber or cylinder 20 is encircled by a block 170 resting on the frame bar 400. This block serves two purposes. A pair of radial passageways 171 therein guide the radial movement of the rotating balling needles 19 and ears 172 projecting radially from the block (Fig. 24) are straddled by the bifurcated levers 173. The levers are pivoted to the ears 172 by pivot pins 174 and intermediate their ends these levers carry rollers 175 coacting with a stripper needle operating cam 176 resting upon the block 170 but rotatable with respect thereto.

Above this cam but fixed with respect to the cylinder is a spacer sleeve 177 having four apertures 178 therein registering with corresponding openings 179 in the forming chamber through which the four equidistantly spaced stripper needles or fingers 21 move radially inwardly and outwardly, these needles being carried by suitable chucks 180 pivotally connected as at 181 to the upper ends of the carrier levers 173. Upon the sleeve 177 a second cam 182 for controlling the radial movement of the balling needles 19 is mounted and the lower end of the casting sleeve 401 terminates just above the cam 182. These "balling" needles have the same balling or spinning effect on the wool, regardless of whether the balled wool is spherical, cylindrical or otherwise.

As best seen from Figs. 22 and 23, stripper needle cam 176 and the balling needle cam 182 may be of identical construction each provided with four depressed portions 184 and four high sides 185. The cams are duplicates for purpose of convenience in manufacture although only two of the depressed and high sides of the cam 182 are actually used in controlling the balling needles.

Leaf springs 186 secured as by screws 187 to the under face of the lugs or ears 172 of the block 170 include upwardly curved free ends acting on the stripper needle carrying levers 173 to normally urge the stripper needles into the forming chamber as seen in Fig. 24. It will be obvious, however, from Fig. 23 that if the cam 176 is rotated slightly in clockwise direction, the high sides acting on the rollers 175 will act to retract all of the stripper needles simultaneously and if the cam 176 is then rotated slightly in a counterclockwise direction, springs 186 will again project the stripper needles into the forming chamber or cylinder 20.

The balling needles 19—19 preferably have complementary interfitting or interlocking ends illustrated as a wedge in one needle and a groove in the other to aid in pinching a wool wad between them and to form bearing surfaces when there is no wool. The needles 19 have bearings not only in the passageways 171 but also bearings in the pendent side flanges 190 of the castings 402. These needles carry intermediate their bearings, fixed collars 191 straddled by the forked lower ends 192 of the actuating levers 193 pivotally secured as at 194 to the casting members 402. Rollers 195 arranged at the intermediate portions of the levers 193 coact with the periphery of the balling needle control cam 182. Coiled springs 196 are attached to the levers 193 and tend to swing the same radially inwardly. The balling needles however except during the time that they are spinning the wool are held in the position of Fig. 25 by the action of the cam 182 on the rollers 195 (Fig. 22).

The springs 196 tend to urge the balling needles toward each other non-positively, and when the layer of wool gripped between their ends is thick enough and dense enough to balance the non-positive pressure of the springs, the needles will not be forced any farther inward even though the depth of the cam depression might permit it. Under such conditions, the springs will ensure a limited follow-up of the needles into the ball during the spinning operation, and will permit slight longitudinal shift of the gripping ends of the needles in case the spinning wad bears more heavily on the forming wall adjacent the base of one needle than on the opposite wall.

While the inward movement of the two sets of needles controlled by the cams 176, 182 is non-positively effected by the springs 186 and 196, the cams themselves are positively moved in both directions, cam 182 having a bracket 200 fixed at its periphery and attached to a push-pull actuating rod 201 and cam 176 being equipped with a similar bracket 202 attached to a similar push-pull rod 203.

The means for supporting and for actuating the cam controlling rods 201 and 203 and also means for imparting a continuously rotating machine of the spinning needles 19 is shown in Figs. 2, 20 and 21.

As best seen from Figs. 2 and 20 the longitudinally extending frame bars 214 are provided with a suitable number of bearings 200 mounting stub shafts 211, each stub shaft carrying a gear 222. All of the gears 222 are of the same size and the teeth thereof are relatively wide. Between each pair of gears 222 there is arranged a small gear 223 fixed upon the outer end of one of the balling needle shafts. The balling needles of each cylinder are of different lengths due to the fact that the cylinder is closer to one of the frame members 214 than the other. The longer balling needle or balling needle shaft may have an extra bearing at 224 in a post rising from one of the frame bars 214.

The balling needle gears 223 are of considerably less width than the teeth of the idle gears 222 so that as the balling needles shift inwardly and outwardly, gears 223 may travel axially without getting out of mesh with the gears 222.

There are thus provided along each of the frame bars 214, sets of relatively small balling needle actuating gears intermeshed with relatively large wide idle gears. By driving any gear of this train it will be apparent that the entire set of gears will be actuated and the two sets of gears are connected for synchronous movement by a countershaft 230 (Fig. 20) carrying at its ends gears 222a (Fig. 3) meshing with two opposite gears 222 and of the same size as these gears.

The means for driving all of the gears continuously includes a worm 231 mounted upon the main shaft 32 of the machine and meshing with a skew gear 232 carried by shaft 233 which constitutes an extension of one of the stub shafts 221 of one of the idle gears 222.

The means for actuating the push-pull rods 201 and 203 which control the cams 182 and 176 respectively is as follows: Mounted upon the main shaft 32 of the machine is a master control cam 235 for all of the balling needle cams 182. Similarly mounted upon this shaft is a cam 236 which controls all of the stripper needle cams 176.

As best seen from Fig. 21 the shaft 138 has pivoted thereon the lower end of a lever 237, this lever near its free end carrying a roller 238 which travels on the surface of the master balling needle cam 235. The free end of the lever 237 is pivoted as at 239 to one end of a link 240, the other end of said link being pivoted as at 241 to a crank plate 242 fixed upon the rock shaft 208. This shaft in turn carries a plurality of crank arms 243 each pivotally connected as at 244 to the end of one of the push-pull rods 201 which actuate the individual balling needle control cams 182.

The stripper needle control cams 176 have a generally similar train of actuating mechanism. This includes a lever 245 pivoted on shaft 138 and carrying near its free end a roller 246 coacting with the master control cam 236 for the stripper needles. At its free end the lever 245 is pivotally connected at 247 to the end of a link 248, the latter at its opposite end being pivotally connected to a characteristic blade 249 fixed upon the rock shaft 207. This rock shaft carries a plurality of crank arms 250. Each crank arm is pivotally connected as at 251 to the push-pull rod 203 which operates one of the stripper finger cams 176.

While the operation of the machine will be for the most part apparent from the foregoing description, it will be briefly summarized as follows. With the parts in the position of Fig. 14 the dart 17 is at the lower end of its stroke and has carried downwardly with it a somewhat compressed segregated mass or wad of wool W. The needle table is at the lowermost portion of its four way rectilinear motion and is just ready to start back on its idle stroke. The stripper needle cams have just been actuated to move all of the stripper needles into the forming chambers above the wad of wool impaled on the dart.

In Fig. 15 the dart has started its upward movement. The stripper fingers have stripped the wad of wool from the dart and have been retracted by their cams and at the same time the balling needles have entered the forming chambers and impaled or pinched the wad between them. These continuously rotating needles have already started to shape the mass into spherical form. At this time the conveyor needle table has started on its rearward stroke.

By the time that the dart reaches the position of Fig. 16, a new length of ribbon has been advanced over the tear tube, the balling needles have about completed their operation of spinning the ball, and the dart is ready for another down stroke. In Fig. 17 the dart is shown carrying a new wad of wool downwardly and the spinning needles have been withdrawn permitting the formed wad free to move down to the bottom of the forming chamber. If this wad contains a quantity of the metal wool sufficient to be properly formed by spinning it in contact with the walls of the tube, the resilience remaining in the fibers of fully formed ball will be sufficient to hold it in place in the tube, after the needles have been retracted, until it is knocked out by the descending dart with its impaled wad of wool.

It will be observed that the formed balls are provided with diametrically opposite pockets therein formed by the balling needles. These pockets provide convenient depressions for handling the ball in use or they may serve to facilitate the introduction of a handle stick into the ball.

The name "metal wool" is used in the present application merely for the sake of descriptive convenience, and is intended to include any and all generally analogous substances regardless of whether they may be inferior or superior to metal wool for cleaning and abrading purposes. Typical of such materials are finely drawn, rolled or extruded metal wires or strands that can be bunched or handled like shaved metal wool and can be used for similar purposes.

As explained above, the words "packing", "packer", or the like, are used in the specification to identify the spring pressed needles 13; and it is to be understood that in the claims these words are intended to imply the wool "measuring" as well as the wool "packing" function.

The word "balling" is used in the specification to identify the rotary members 19, the wad engaging ends of which are of small diameter so as to engage only a small area of the wad; and which in this case do form balls because the forming chamber is cylindrical; but it is to be understood that in the claims this word balling is intended to imply their spinning and rolling action on the wool regardless of whether the product has spherical, cylindrical or other outline, and the word "needle" is intended to imply rotary members having diameters and end engaging surfaces which are small as compared with the volume of the body of wool to be engaged, rotated and formed thereby.

Having thus described my invention, what I claim as new and desire to secure by Letters Patent is:—

1. An apparatus of the character described including a forming chamber, means for carrying a wad of metal wool or the like into the chamber, means to strip the wool from the carrier, and rotary means movable to engage the wad of wool at diametrically opposite points and spin the wad into a shape determined by the cross sectional shape of the forming chamber.

2. An apparatus of the character described including a forming chamber into which a wad of wool or the like is adapted to be inserted, and means including a pair of axially aligned rotary means projected into the chamber from opposite sides thereof, engageable with the wool at diametrically opposite points and simultaneously rotatable, to spin the wad into a shape predetermined by the cross sectional shape of the forming chamber.

3. An apparatus of the character described including a forming chamber into which a wad of wool or the like is adapted to be inserted, and means for spinning the wad into a shape predetermined by the cross sectional shape of the forming chamber, including a pair of axially aligned rotary means projected into the chamber from opposite sides thereof, engageable with the wool at diametrically opposite points and simultaneously rotatable, and means for yieldably pressing said rotary means into engagement with the wad.

4. An apparatus of the character described including a forming chamber into which a wad of wool or the like is adapted to be inserted, means including a pair of axially aligned balling needles projected into the chamber from opposite sides thereof, engageable with the wool at diametrically opposite points and simultaneously rotatable about their axes to spin the wad into a shape predetermined by the cross sectional shape of the forming chamber, said needles being spring pressed into engagement with the wad, and means to retract the needles against the action of their springs and thereby permit release of the spun mass.

5. A machine of the character described including a ball forming chamber and means for shaping a wad in said chamber including continuously rotating axially aligned balling needles projected into the chamber from opposite sides thereof and movable longitudinally of themselves into and out of the chamber.

6. A machine of the character described including a wad forming chamber, and means for rotating a wad in said chamber including rotatable axially aligned spinning needles movable radially into and out of the chamber at opposite sides thereof, and spring means operative to advance the needles into wad impaling position.

7. A machine of the character described including a wad forming chamber, and means for rotating a wad in said chamber including rotatable axially aligned spinning needles movable radially into and out of the chamber at opposite sides thereof, spring means operative to advance the needles into wad impaling position and positive means for retracting the needles against the action of their springs.

8. In a machine of the class described a wad shaping chamber into which a wad of metal wool is adapted to be introduced, means for advancing the wad into the chamber, stripper means for engaging the wad and stripping it from its advancing means, spring means normally urging the stripper means into wad engaging position, and means for engaging and rotating the wad in said chamber after it is stripped from the advancing means to spin it into shape.

9. The combination with a forming chamber of a barbed dart reciprocable into and out of said chamber to carry an impaled wad of wool into the chamber, stripper needles movable through the chamber walls to strip the wad from the dart, spinning needles engageable with the wad after it is stripped from the dart to spin the wad into a shape predetermined by the shape of the forming chamber and means for operating said barbed dart, said stripper needles and said spinning needles.

10. The combination with a forming chamber of a barbed dart reciprocable into and out of said chamber and adapted to carry an impaled wad of wool into the chamber, stripper needles movable through the chamber walls to strip the wad from the dart, spinning needles engageable with the wad after it is stripped from the dart to spin the wad into a shape predetermined by the shape of the forming chamber dart-operating means, stripper-needle-operating means, spinning-needle-operating means, and means for operating said dart-operating means, said stripper-needle-operating means and said spinning-needle-operating means in properly timed relation.

11. The combination with a forming chamber of a barbed dart reciprocable into and out of said chamber and adapted to carry an impaled wad of wool into the chamber, stripper needles movable through the chamber walls to strip the wad from the dart, spinning needles engageable with the wad after it is stripped from the dart to spin the wad into a shape predetermined by the shape of the forming chamber and means to operate the dart and needles and substantially simultaneously withdraw the stripper needles from the wad and move the spinning needles into engagement with the wad.

12. The combination with a forming chamber, of a holding device reciprocable into and out of said chamber and adapted to carry a wad of wool into said chamber, stripper devices movable through the chamber walls to strip the wad from the holding device, spinning devices engageable with the wad at opposite sides thereof after it is stripped from the holding device to spin the wad into a shape predetermined by the shape of the forming chamber, means for continuously rotating the spinning devices and yieldably moving them inwardly at opposite sides of the chamber to engage a wad and then outwardly to release the same, and means for operating the holding device and stripper devices to cause the stripper devices to hold a wad in position to be gripped by the spinning devices and then release the wad to the spinning devices.

13. In a machine of the character described, a tube, means for advancing a ribbon of metal wool across an end of the tube, means including a reciprocable wool-holding device to tear a section of wool from the ribbon and force it into said tube, stripper needles moving radially through the tube to strip the wool from the device on the up stroke thereof, spinning needles moving radially through the tube into engagement with the wad as the stripper needles are withdrawn therefrom, and means for operating the stripper needles and the spinning needles in properly timed relation.

14. In a machine of the class described, a forming chamber, means for successively placing individual wads of metal wool in said chamber, an impaling member, and means for straight-line-reciprocating said impaling member into the chamber to impale a wad therein and out of said chamber to release the wad and means for rotating said impaling member in the forming chamber about such line of movement as an axis to spin the wad into a predetermined shape of circular cross section in at least one direction.

15. In a machine of the class described, a forming chamber, means for placing wads in said chamber, stripper mechanism including a plurality of inwardly movable stripper needles, and needle operating means including springs normally urging the needles toward a common center and a cam member adapted to act on all of the needles and move them in the opposite direction against the action of their springs.

16. In a machine of the class described, means for advancing a ribbon of metal wool in a horizontal path, means reciprocating at right angles to the direction of travel of the ribbon for separating wads from the leading end of said ribbon, a forming chamber arranged below the path of travel of the ribbon and into which said wads are carried by the segregating means, and continuously rotating balling needles movable radially into and out of the forming chamber to impale wads of wool delivered thereto, spin the wads and release them and means for advancing the ribbon and operating the segregating means and balling needles in properly timed non-interfering relationship.

17. In a wool wad forming mechanism of the class described, a forming chamber, a barbed dart for delivering a wad of wool to the chamber, stripper needles movable inwardly with respect to the chamber to strip the wad from the dart, continuously rotating balling needles movable radially into and out of the chamber at opposite sides thereof to engage, spin and release the wad, and means operating the dart, stripper needles and balling needles in properly timed relation.

18. In a machine of the class described a vertical cylindrical forming chamber, a barbed dart for advancing a wad of metal wool downwardly into the chamber, means to strip the wad from the dart, a pair of balling needles movable radially into and out of the chamber to engage, spin and release a wad of wool, and means for so timing the stripper means and the balling needles that the advancing wad of wool carried by the dart may dislodge a previously spun ball on the downward movement of the dart.

CROSBY FIELD.